(12) United States Patent
Asaumi

(10) Patent No.: US 6,278,488 B1
(45) Date of Patent: Aug. 21, 2001

(54) SOLID-STATE IMAGE DEVICE

(75) Inventor: Masaji Asaumi, Kyoto (JP)

(73) Assignee: Matsushita Electronics Corporation, Osaka (JP)

( * ) Notice: Subject to any disclaimer, the term of this patent is extended or adjusted under 35 U.S.C. 154(b) by 0 days.

(21) Appl. No.: 08/997,116

(22) Filed: Dec. 23, 1997

(30) Foreign Application Priority Data

Dec. 27, 1996 (JP) .................................................... 8-351555

(51) Int. Cl.⁷ .................................................... H04N 5/335
(52) U.S. Cl. .................................................... 348/314; 348/299
(58) Field of Search .................................................... 348/207, 241, 348/248, 249, 243, 222, 294, 297, 298, 299, 311, 314, 315, 316, 317, 320, 321; 250/208.1

(56) References Cited

U.S. PATENT DOCUMENTS

| 5,057,926 | * | 10/1991 | Watanabe | 348/314 |
| 5,432,551 | * | 7/1995 | Matsunaga | 348/299 |
| 5,990,953 | * | 11/1999 | Nakashiba | 348/314 |

FOREIGN PATENT DOCUMENTS

| 0 444 696 | 9/1991 | (EP) . |
| 0 513 683 | 11/1992 | (EP) . |
| 0 548 892 | 6/1993 | (EP) . |
| 0 854 517 | 7/1998 | (EP) . |
| 2-205359 | 8/1990 | (JP) . |
| 6/334166 | 12/1994 | (JP) . |
| 9-223788 | 8/1997 | (JP) . |

OTHER PUBLICATIONS

Dec. 23, 1998 Australian Patent Office Search Report.
Jan. 13, 1999, Communication from European Patent Office and attached Search Report.

* cited by examiner

*Primary Examiner*—Tuan Ho
(74) *Attorney, Agent, or Firm*—Merchant & Gould P.C.

(57) ABSTRACT

A solid-state image device comprises a plurality of photoelectric converters arranged on a semiconductor substrate; a plurality of vertical charge coupled devices (CCDs) that receive signal charges from the photoelectric converters and transfer the signal charges; a horizontal CCD that receives the signal charges transferred by the vertical CCDs and transfers the signal charges in the direction crossing the vertical CCDs; and a signal output circuit that receives the signal charge transferred by the horizontal CCD and outputs the signal voltage corresponding to the signal charge. The vertical CCD has a normal mode for transferring the signal charges synchronizing with the horizontal CCD and a high-speed mode for transferring the signal charges quickly without synchronizing with the horizontal CCD. A potential barrier region and a charge drain region are formed along the side of the horizontal CCD opposite to the connection side with the vertical CCDs. The charge drain region has a resistance R and a capacitance C such that their product value RC is smaller than substantially ten times of the transfer period of the vertical CCD in the high-speed mode.

9 Claims, 13 Drawing Sheets

SOLID-STATE IMAGE DEVICE

BACKGROUND OF THE INVENTION

The present invention relates to a solid-state image device using a charge coupled device, and more specifically a solid-state image device that can improve image quality. The present invention also relates to a method for driving such a device and a process for manufacturing the same.

Recently, a solid-state image device presented by a charge coupled device (CCD) is widely used for its advantages such as low noise characteristics.

FIG. 12 illustrates a structure of a solid-state image device in the prior art. In this figure, a plurality of photodiodes (photoelectric converters) 1 and vertical CCDs (first charge transfer devices) 2 are arranged two-dimensionally. Each of the photodiodes 1 is connected to the corresponding vertical CCD 2. The end portion of each vertical CCD is connected to a horizontal CCD (a second charge transfer device) 3. The end portion of the horizontal CCD 3 is connected to an output amplifier (a signal output circuit) 4 that works as a charge detector.

A signal charge generated by photoelectric conversion in the photodiode 1 of each pixel is supplied to the vertical CCD 2 to be transferred in it. A plurality of the vertical CCDs 2 transfer signal charges simultaneously and give them to the horizontal CCD 3. The signal charges corresponding to a line of pixels are transferred in the horizontal CCD 3 and supplied to the output amplifier 4 in turn, which converts the signal charges into a sequential output voltage signal.

FIGS. 13–15 illustrate a structure of the horizontal CCD in the prior art, which is driven by a two-phase driving method. FIG. 13 is a partial plan view showing the horizontal CCD in the direction rotated 90 degrees from that of FIG. 12. FIG. 14 shows a cross section along line a'-a" of FIG. 13 and its potential distribution in a channel portion. FIG. 15 shows a cross section along line a–a' of FIG. 13 and its potential distribution in a channel portion.

In these figures, numeral 5 denotes a p-type region, i.e., a p diffusion layer or a p-type semiconductor substrate. Numeral 6 is an n-type region, i.e., an n diffusion layer that is used as a channel portion of a so-called buried type channel CCD. Numeral 7 is an $n^-$-type region, i.e., an $n^-$ diffusion layer. Elements 8a and 8b are first layer electrodes to which a driving pulse is applied, and 9a and 9b are second layer electrodes to which a driving pulse is applied. The first layer electrodes 8a and the second layer electrodes 9a are connected to a voltage applying terminal 11, while the first layer electrodes 8b and the second layer electrodes 9b are connected to a voltage applying terminal 10. In FIG. 14, an electrode 12 of the end portion of the vertical CCD is also shown.

FIG. 16 shows voltage waveforms of the two-phase driving pulse φ H1 and φ H2 applied to the voltage applying terminals 10 and 11 respectively. The potential distribution of the channel portion at t=t1 in FIG. 16 is illustrated by full lines in FIGS. 14 and 15, while the potential distribution at t=t2 in FIG. 16 is illustrated by broken lines in FIGS. 14 and 15.

As shown in FIG. 16, at t=t1, H (high) level voltage is applied to the voltage applying terminal 10 and L (low) level voltage is applied to the voltage applying terminal 11. Thus, as shown by the full line in FIG. 15, a potential level of the transfer channel facing the first layer electrode 8b and the second layer electrode 9b becomes higher than that of the transfer channel facing the first layer electrode 8a and the second layer electrode 9a. This potential difference forms a depletion region that is called a "potential well". In this potential well the signal charge 13 is accumulated.

At t=t2, the voltage applied to the voltage applying terminal 11 is switched to the H level and the voltage applied to the terminal 10 is switched to the L level. Consequently, the signal charge 13 is transferred from the potential well in the channel portion facing the first layer electrode 8b to the potential well in the channel portion facing the first layer electrode 8a to become signal charge 14. It is desired that charge quantity of signal charge 14 is equal to that of signal charge 13.

Signal charges are transferred sequentially in the horizontal CCD by repeating the above mentioned operation. The $n^-$-type regions 7, which are formed in the n-type region and face the second layer electrodes 9a, 9b, enable easy movement of charges by smoothing potential steps between portions facing the first layer electrodes 8a and 8b.

The charge transfer operation in the vertical CCD shown in FIG. 12 is performed basically in the same way as the horizontal CCD 12. However, the transfer speed is much slower in the vertical CCD than in the horizontal CCD. Therefore, the vertical CCD usually does not have the structure such as the $n^-$-type regions 7 mentioned above. Three or four-phase driving pulse can smooth the potential steps.

In a video camera using such a solid-state image device, for example, some signal charges of pixels located in the periphery of the screen may be abandoned for a certain operation such as electronic image stabilizing (EIS). For example, signal charges corresponding to tens to one hundred and more lines of the start and end portions of a field are abandoned out of the signal charges transferred to the horizontal CCD from the vertical CCD in every field.

For an efficient abandoning operation within a vertical blanking period, a special structure of the horizontal CCD has been proposed as disclosed in Japanese laid-open patent application (Tokukaihei) 2-205359. This structure has a potential barrier region and a charge drain region formed along the side of the horizontal CCD opposite to connection side with the vertical CCDs. This structure enables the draining of charges transferred from the vertical CCD to the horizontal CCD, directly from the side of the horizontal CCD into a power supply line. In this case, the vertical CCD has two transfer modes, a normal mode and a high-speed mode. In the normal mode the signal charges are transferred at a low-speed synchronizing with the horizontal CCD, while in the high-speed mode the signal charges are transferred quickly without synchronizing with the horizontal CCD for abandoning the unnecessary signal charges.

In the above mentioned solid-state image device of the prior art, the operation for abandoning the unnecessary signal charges should be completed within the vertical blanking period. If the operation is not completed within the vertical blanking period and some unnecessary signal charges remain in the horizontal CCD, a certain deterioration of image would occur. For example, a white horizontal line would appear on the upper side of the screen. Therefore, it is necessary to optimize the structure of the potential barrier region and the charge drain region in connection with driving parameters to abandon the unnecessary charges in the vertical blanking period using such a horizontal CCD with the potential barrier region and the charge drain region. Some unnecessary signal charges that have not overflowed the potential barrier should be abandoned by a transfer operation in the horizontal CCD within the vertical blanking period.

The present invention is aimed at an optimized structure of the horizontal CCD of the solid-state image device and its driving method for abandoning the unnecessary signal charges efficiently and surely through the charge drain region and by the transfer operation of the horizontal CCD within the vertical blanking period. It is also the object to present an efficient process for manufacturing such a solid-state image device.

SUMMARY OF THE INVENTION

The first configuration of a solid-state image device according to the present invention comprises a plurality of photoelectric converters arranged on a semiconductor substrate; a plurality of first charge transfer devices that receive signal charges from the photoelectric converters and transfer the signal charges; a second charge transfer device connected to an end of each of the first charge transfer device for receiving the signal charges transferred by the first signal transfer devices and for transferring the signal charges in the direction crossing the first charge transfer devices; a signal output circuit that receives the signal charge transferred by the second charge transfer devices and outputs a signal voltage corresponding to the signal charge; a potential barrier region and a charge drain region formed along the side of the second charge transfer device opposite to the connection side with the first charge transfer devices. The first charge transfer devices have a normal mode for transferring the signal charges synchronizing with the second charge transfer device and a high-speed mode for transferring the signal charges quickly without synchronizing with the second charge transfer device. The charge drain region has a resistance R and a capacitance C such that their product value RC is smaller than substantially ten times the transfer period of the first charge transfer device in the high-speed mode.

According to the above-mentioned configuration, since the time constant RC is determined properly, unnecessary signal charges transferred from the first charge transfer device to the second charge transfer device in the high-speed mode can move to the power supply through the charge drain region fluently after overflowing the potential barrier region.

It is preferable that the potential barrier region and the charge drain region are formed in the step in which the photoelectric converters or the first charge transfer devices are formed. As explained later in detail, the potential barrier region and the charge drain region can be formed in the second charge transfer device without increasing the number of process steps.

The second configuration of a solid-state image device according to the present invention comprises a plurality of photoelectric converters arranged on a semiconductor substrate; a plurality of first charge transfer devices that receive signal charges from the photoelectric converters and transfer the signal charges; a second charge transfer device connected to an end of each of the first charge transfer device for receiving the signal charges transferred by the first signal transfer devices and for transferring the signal charges in the direction crossing the first charge transfer devices; a signal output circuit that receives the signal charge transferred by the second charge transfer devices and outputs the signal voltage corresponding to the signal charge; and potential barrier and charge drain regions formed along the side of the second charge transfer device opposite to the connection side with the first charge transfer devices. The first charge transfer devices have a normal mode for transferring the signal charges synchronizing with the second charge transfer device and a high-speed mode for transferring the signal charges fast without synchronizing with the second charge transfer device. A charge accumulation quantity defined by a potential of the potential barrier region and a potential of the second charge transfer device is smaller than substantially k times the transfer capacity of the second charge transfer device when a period from the end of the high-speed transfer mode to the beginning of the normal mode is k times the horizontal scanning period that is the full transfer period of the second charge transfer device.

According to the above-mentioned configuration, since the charge accumulation capacity is smaller than k times the transfer capacity of the second charge transfer device, unnecessary signal charges remaining in the second charge transfer device can be surely removed by k times of transfer operation. Thus, the before-mentioned problem about the image quality does not occur. Again, it is preferable that the potential barrier region and the charge drain region are formed in the step in which the photoelectric converters or the first charge transfer devices are formed.

The potential of the potential barrier region is preferably lower than or substantially equal to the lower potential that defines the transfer capacity of the second charge transfer device. It is also preferable that the second charge transfer device has first and second layer electrodes, a potential of the semiconductor substrate portion facing the first layer electrode is higher than that facing the second layer electrode, the second layer electrode is connected with the next first layer electrode in the transfer direction, and the potential of the potential barrier region is substantially the same as the potential of the substrate portion facing the second layer electrode.

Moreover, it is preferable that the second charge transfer device has first and second layer electrodes, a potential of the semiconductor substrate portion facing the first layer electrode is higher than that facing the second layer electrode by $\phi$, the second layer electrode is connected with the next first layer electrode in the transfer direction, and the relationship between the potential $\phi 1$ of the potential barrier region and the potential $\phi 2$ of the substrate portion facing the second layer electrode is expressed by the following equation when an area of the first layer electrode facing the semiconductor substrate is x times of an area of the second layer electrode facing the semiconductor substrate.

$$\phi 2 - \phi 1 < (k-1)\phi/(x+1)$$

A method for driving a solid-state image device according to the present invention comprises the steps of switching the transfer mode of the first charge transfer devices between a normal mode for transferring the signal charges synchronizing with the second charge transfer device and a high-speed mode for transferring the signal charges quickly without synchronizing with the second charge transfer device; and setting a period from the end of the high-speed transfer mode to the beginning of the normal mode more than k times the horizontal scanning period that is the full transfer period of the second charge transfer device when a charge accumulation capacity defined by a potential of the potential barrier region and a potential of the second charge transfer device is k times the transfer capacity of the second charge transfer device.

According to the above-mentioned method, unnecessary signal charges remaining in the second charge transfer device can be surely removed by k times of transfer operation. Thus, the before-mentioned problem about the image quality does not occur.

In a process for making such a solid-state image device according to the present invention, the potential barrier region and the charge drain region are formed in the step in which the photoelectric converters or the first charge transfer devices are formed.

According to the above-mentioned process, solid-state image devices having a potential barrier region and a charge drain region in the second charge transfer device can be produced efficiently without increasing process steps. It is preferable that the potential barrier region is formed in the step in which a region is formed that controls the signal charge movement from the photoelectric converter to the first charge transfer device.

DETAILED DESCRIPTION OF THE PREFERRED EMBODIMENTS

The present invention will be explained in detail by referring to FIGS. 1–11, focusing on the difference between the present invention and the prior art explained above referring to FIGS. 12–16.

First Embodiment

Figure 1:
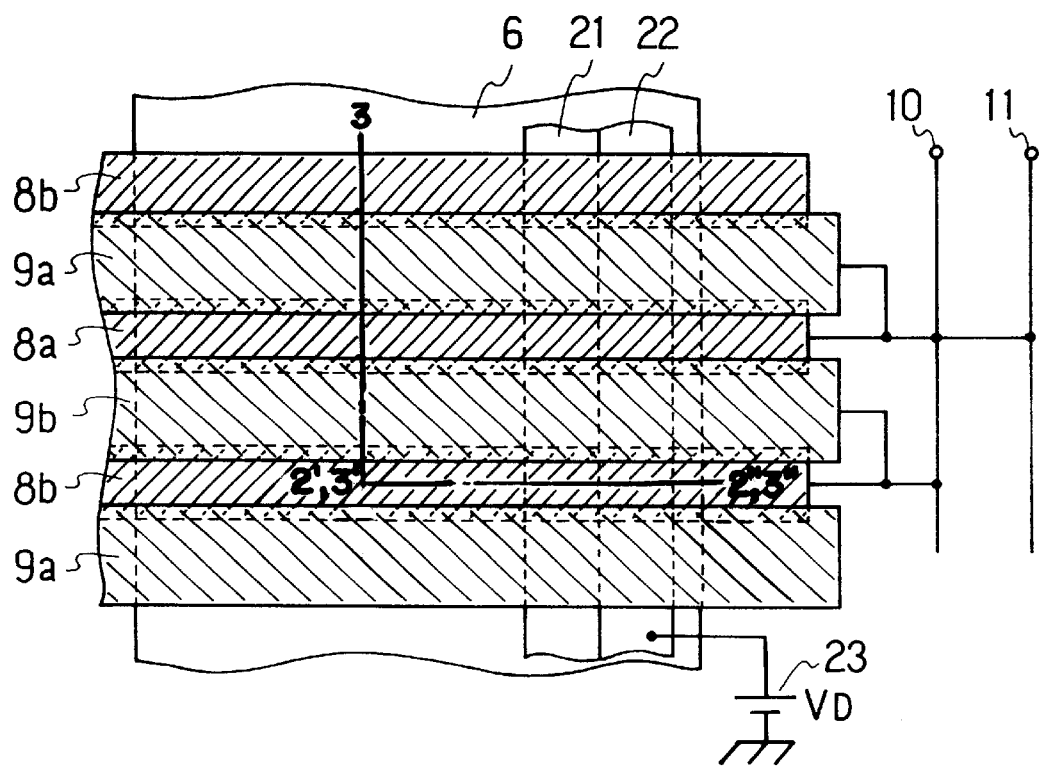
FIG. 1 is a plan view of a two-phase driving type horizontal CCD used in a solid-state image device according to the first embodiment of the present invention.
Figure 2:
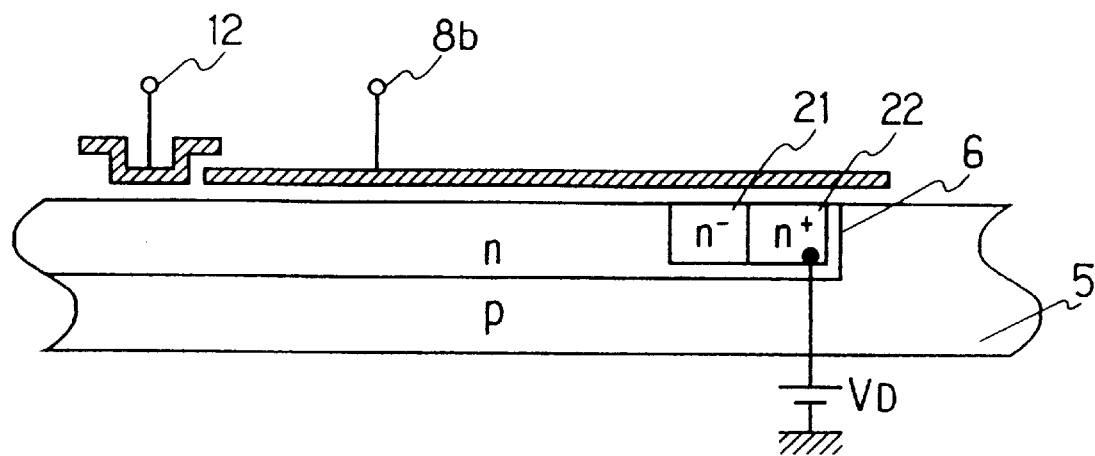
FIG. 2 is a cross section along line b'-b" in FIG. 1.
Figure 3:
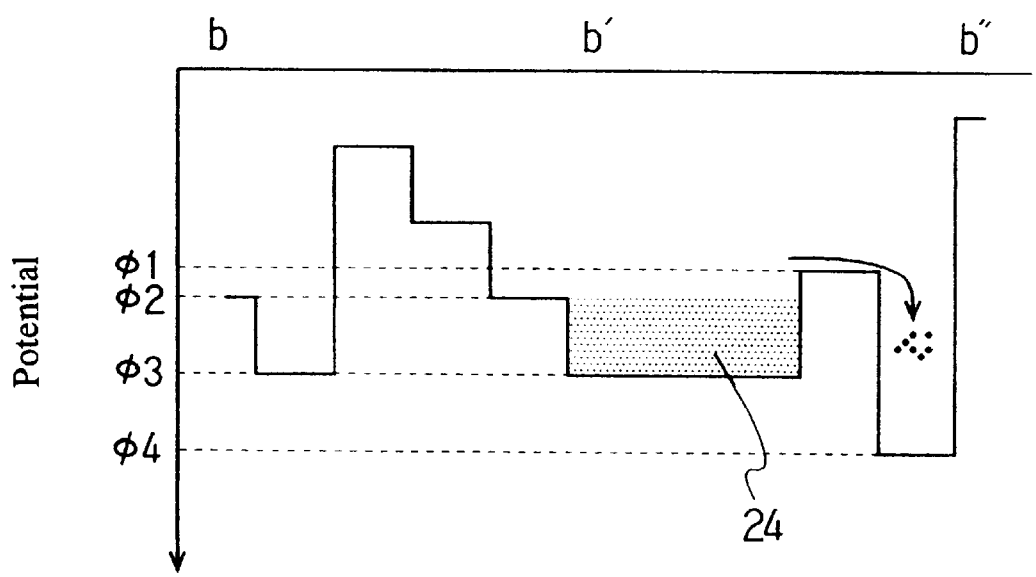
FIG. 3 shows a potential distribution along line b-b'-b" in FIG. 1.

FIG. 1. shows a two-phase driving type horizontal CCD used in a solid-state image device according to the first embodiment of the present invention. FIG. 2 shows a cross section along line b'-b" in FIG. 1. FIG. 3 shows a potential distribution along line b-b'-b" in FIG. 1, which is a potential distribution at t=t1 of the driving pulse shown in FIG. 16.

The horizontal CCD in this embodiment has an n-type region 6 that is an n diffusion layer formed on a p-type region 5 that is a p diffusion layer or substrate. This n-type region 6 is used as a channel portion of the horizontal CCD. The n-type region 6 is provided with a potential barrier region 21 and a charge drain region 22. To be accurate, the $n^-$ diffusion layer 21 and the p-type region 5 just under the $n^-$ diffusion layer 21 constitute the barrier region. In the same way, the $n^+$ diffusion layer 22 and the p-type region 5 just under the $n^+$ diffusion layer 22 constitute the drain region. The drain region 22 is formed along the side of the n-type region 6 opposite to the side that is connected with vertical CCDs, and the potential barrier region 22 is formed along the inner side of the drain region 22. The drain region ($n^+$ diffusion layer) 22 is connected with the power supply 23 applying a voltage VD. A cross section and its potential distribution along line b-b' in FIG. 1 as well as a driving method of the horizontal CCD are the same as those explained above referring to FIGS. 15 and 16.

FIG. 3 shows a potential distribution along the line b-b'-b" of FIG. 1. $\phi 1$ is the potential of the potential barrier region 21, $\phi 2$ is a potential of the channel facing the second layer electrode 9b (FIG. 15), $\phi 3$ is a potential of the channel facing the first layer electrode 8b (FIG. 15), and $\phi 4$ is a potential of the drain region 22.

A charge transferred from the channel of the vertical CCD is accumulated as a signal charge 24 in the potential well of the channel (potential $\phi 3$) facing the first layer electrode 8b. A capacity of this channel facing the first layer electrode 8b, that is a capacity defined by an area of the first layer electrode 8b and a potential difference ($\phi 3 - \phi 2$) is a transfer capacity of the horizontal CCD. Usually, the transfer capacity of the horizontal CCD is designed larger than that of the vertical CCD. However, as mentioned before, if the vertical CCD transfers signal charges one after another in the high-speed mode without synchronizing with transfer of the horizontal CCD, a charge quantity accumulated in the horizontal CCD exceeds the transfer capacity of the horizontal CCD resulting in an overflow of the charge into a channel (potential $\phi 2$) facing the second layer electrode 9b.

In this embodiment, when the charge quantity accumulated in the horizontal CCD exceeds the transfer capacity of the horizontal CCD, charges exceeding the potential $\phi 1$ of the potential barrier region 21 overflow into the power supply 23 (VD) through the drain region 22. The charge quantity accumulated in the channel facing the first layer electrode 8b and the second layer electrode 9b can be controlled near to the transfer capacity of the horizontal CCD by setting the potential $\phi 1$ substantially equal to the potential $\phi 2$ of the second layer electrode 9b.

The signal charge should be present between potential $\phi 2$ and potential 3 for the normal transfer of charges in the horizontal CCD. If the potential $\phi 1$ is set higher than the potential $\phi 2$, the transfer capacity of the horizontal CCD becomes smaller by the amount corresponding to the potential difference ($\phi 2 - \phi 1$). In this case, it may be difficult to transfer all of the signal charges normally, and the signal charge may overflow into the drain region 22 every transfer stage. As a result, a signal charge amount may decrease along with increases of the transfer stage. Thus, so-called shading may happen, in which the right side becomes dark compared with the left side of the screen. Therefore, the potential $\phi 1$ should be lower than or equal to the potential $\phi 2$.

On the other hand, if the potential φ 1 of the potential barrier region 21 is set lower than φ 2, and if the potential difference (φ 2–φ 1) is too large, the ability to drain unnecessary charges through the drain region 22 may become insufficient. Therefore, an allowance (i.e., a lower limit) of the potential φ 1 should be considered.

The lower limit of the potential φ 1 has a certain relationship with the time period that starts at the end of the transfer of the unnecessary charges from the vertical CCD into the horizontal CCD in the high-speed mode and ends at the beginning of the transfer of the necessary signal charges in the normal mode. Supposing that this time period is k times the full transfer period of the horizontal CCD that is the horizontal scanning period, the discharge transfer of the unnecessary charges in the horizontal transfer CCD can be performed k times. In this case, if the accumulation charge quantity defined by the potential φ 1 is smaller than k times the transfer capacity of the horizontal CCD, all of the unnecessary charges can be discharged within the vertical blanking period.

For example, when the area of the first layer electrode 8a and that of the second layer electrode 9a are in the ratio of 1:x, the accumulation charge quantity Q1 can be determined by the equation (1).

$$Q1=((\phi3-\phi2)+(\phi2-\phi1)(\phi1+x))C1 \tag{1}$$

where C1 is a constant. Since the transfer capacity of the horizontal CCD is (φ 3–φ 2)C1, the expression (2) should be satisfied so that the accumulation charge quantity Q1 defined by φ 1 is smaller than k times of the transfer capacity of the horizontal CCD.

$$\phi2-\phi1<(k-1)(\phi3-2)/(x+1) \tag{2}$$

For example, when x=1, k=2, and φ 3–φ 2=1 volt, the lower limit of the potential φ 1 is lower than the potential φ 2 by 0.5 volts.

Figure 4:
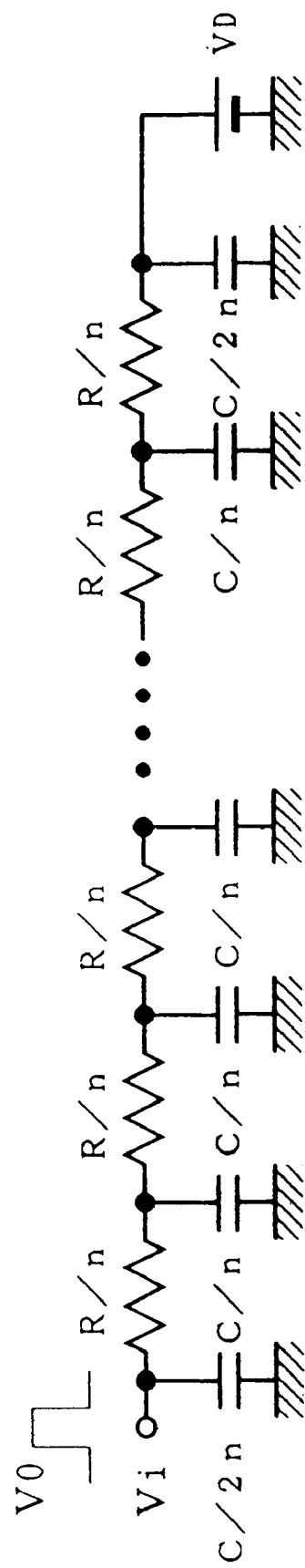
FIG. 4 shows an equivalent circuit of the drain region of the horizontal CCD in the first embodiment.

The operation of the drain region 22 will be explained next. Usually, wiring and diffusion regions in a semiconductor device can be simulated by a distributed constant circuit including resistors and capacitors. In this case, the drain region 22 can be expressed by a ladder circuit including resistors and capacitors as shown in FIG. 4. Considering its function, one end of the circuit is connected to the power supply VD and another end is supplied with a pulse voltage V0. In FIG. 4, R, C and n are a whole resistance, a whole capacitance and a step number of the horizontal CCD respectively. A potential change rate ΔV/V0 at the pulse input terminal Vi in this circuit is expressed by the equation (3).

$$\Delta V/V0=(4/\pi)\exp(-\pi^2 t/4RC) \tag{3}$$

Figure 5:
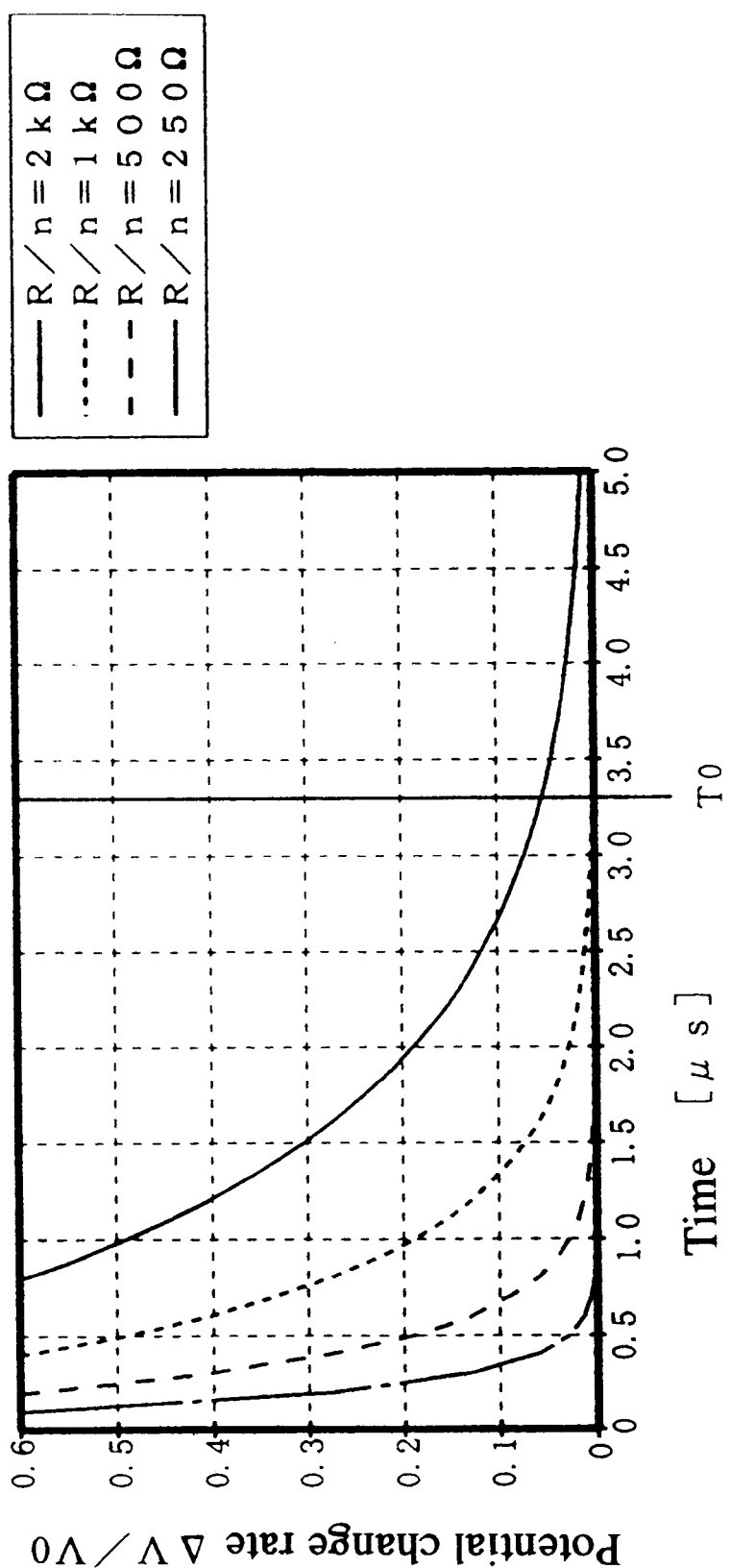
FIG. 5 is a graph showing a potential change per one step of the horizontal CCD in the first embodiment.

FIG. 5 shows the voltage change rate calculated by the equation ( 3) depended on a resistance per one stage of the horizontal CCD. As shown in this figure, the recovery of the potential needs a longer time as the resistance increases. In other words, if the resistance of the drain region 22 increases, overflowed charges become reluctant to flow into the power supply 23 and are accumulated in the drain region 22. As a result, it becomes difficult to discharge unnecessary charges from the horizontal CCD.

The condition for the drain region not to be filled with the overflowed charges will be explained next. Hereinafter, T0 is a transfer period of the vertical CCD that transfers unnecessary charges into the horizontal CCD, m is a stage number of unnecessary charges transferred in the vertical CCD, V0 is an initial voltage change of the drain region 22 generated by the unnecessary charges per one stage transferred from the vertical CCD, φ 1 is a potential of the potential barrier region, φ 4 is an initial potential of the drain region 22, and A0 is a value obtained from the equation (3) assigning t=T0.

First, a potential v1 of the drain regions 22 when charges of the first stage are transferred is expressed by the equation (4).

$$v1=V0 \tag{4}$$

A potential when the charges of the second stage are transferred is expressed by the equation (5).

$$v2 = v1 \times A0 + V0 \tag{5}$$
$$= V0(1 + A0)$$

A potential when the charges of the third stage are transferred is expressed by the equation (6).

$$v3 = v2 \times A0 + V0 \tag{6}$$
$$= V0(1 + A0)A0 + V0$$
$$= V0(1 + A0 + A0^2)$$

In the same way, a potential vm of the drain region 22 after the charges of the m-th step have been transferred is expressed by the equation (7).

$$vm=V0(1+A0+A0^2+A0^3+ \ldots +A0^{m-1}) \tag{7}$$

Considering the most critical condition where m is about 200 and A0<1, the equation (7) can be simplified by an approximation as shown in the equation (8).

$$vm=V0/(1-A0) \tag{8}$$

This potential vm should be smaller than the potential difference between the drain region 22 and the potential barrier region 21. Hence expression (9) is derived.

$$V0/(1-A0)<(\phi4-\phi1) \tag{9}$$

From this expression (9) and the equation (3), the expression (10) is derived.

$$R\times C<10.2\times T0 \tag{10}$$

This equation (10) is the condition for determining the proper range of resistance and capacitance of the drain region 22. For example, when T0=3.3 μ sec and C=5 pF, the resistance R should be smaller than 6.7 megohm. In this case, the resistance per one stage of 800 stages of the horizontal CCD should be smaller than 8.4 kohm.

Second Embodiment

Figure 6:
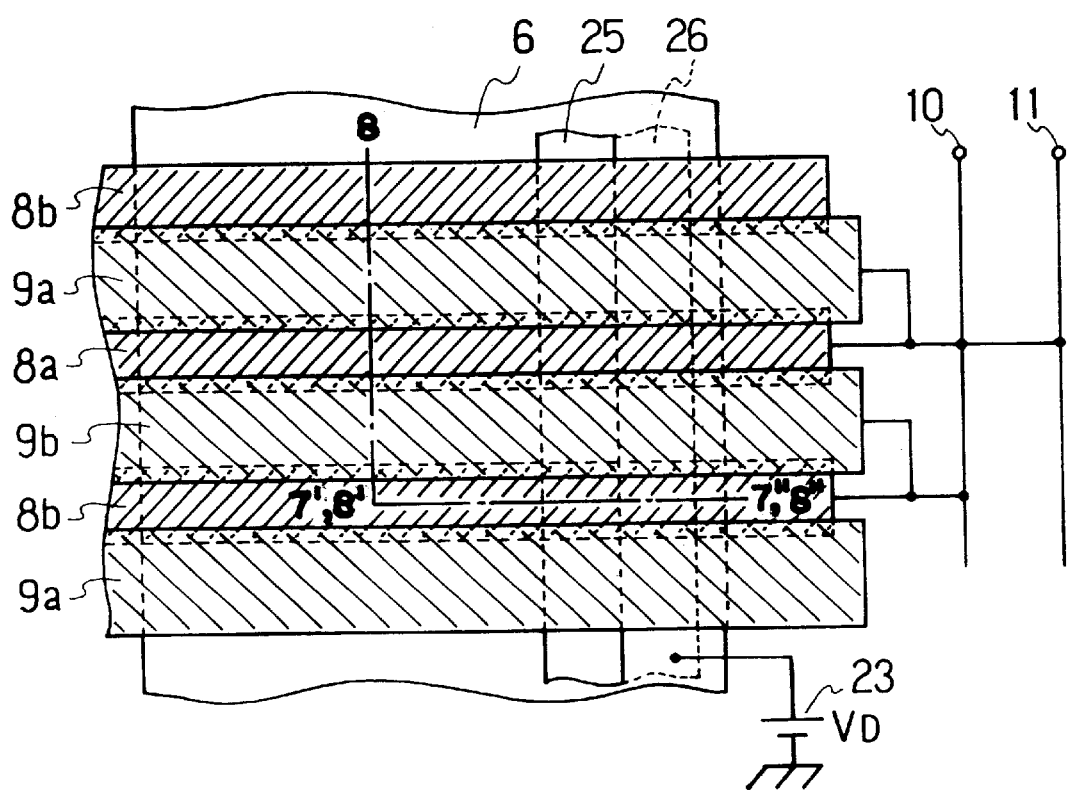
FIG. 6 is a plan view of the two-phase driving type horizontal CCD according to the second embodiment of the present invention.
Figure 7:
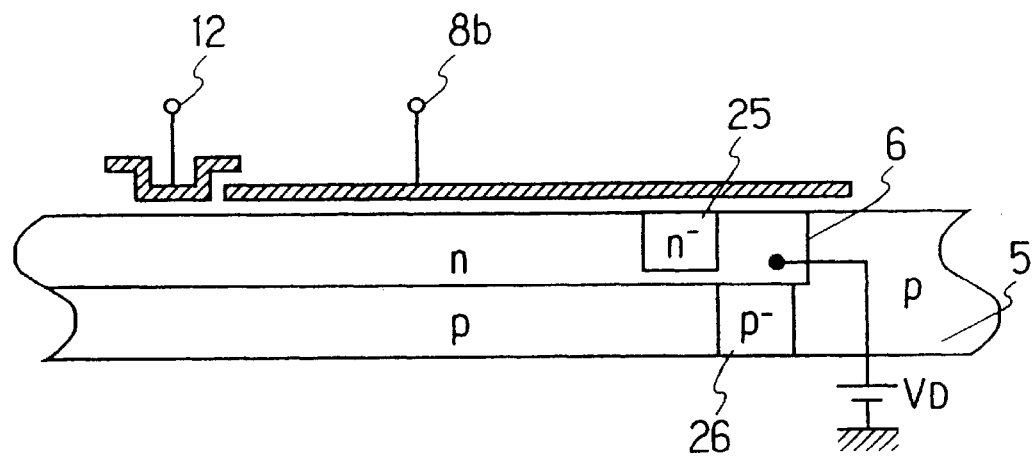
FIG. 7 is a cross section along line d'-d" in FIG. 6.
Figure 8:
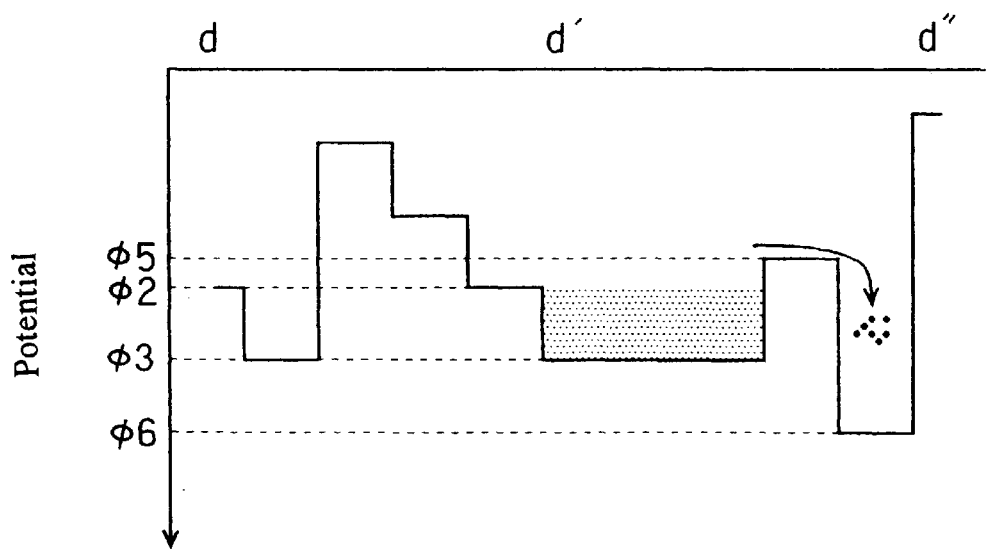
FIG. 8 shows a potential distribution along line d-d'-d" in FIG. 6.

FIG. 6 shows a plan view of a so-called two-phase driving type horizontal CCD used in a solid-state image device according to the second embodiment of the present invention. FIG. 7 shows a cross section along line d'-d" of FIG. 6. FIG. 8 shows a potential distribution along line d-d'-d" of FIG. 6.

As understood by comparing FIG. 7 with FIG. 2 of the first embodiment, this embodiment differs from the first embodiment in that the drain region is made of n-type region 6 and p⁻-type region (p⁻ diffusion layer) 26 under the n-type region 6. This structure performs the same function as the drain region of the first embodiment that is made of the n⁻ diffusion layer (numeral 22 in FIG. 2). φ 5 is the potential of the potential barrier region 25, and φ 6 is the potential of the drain region 26. Potential values of φ 5 and φ 6, as well as a resistance and capacitance of the drain region, can be explained in the same way as the first embodiment.

Figure 9:
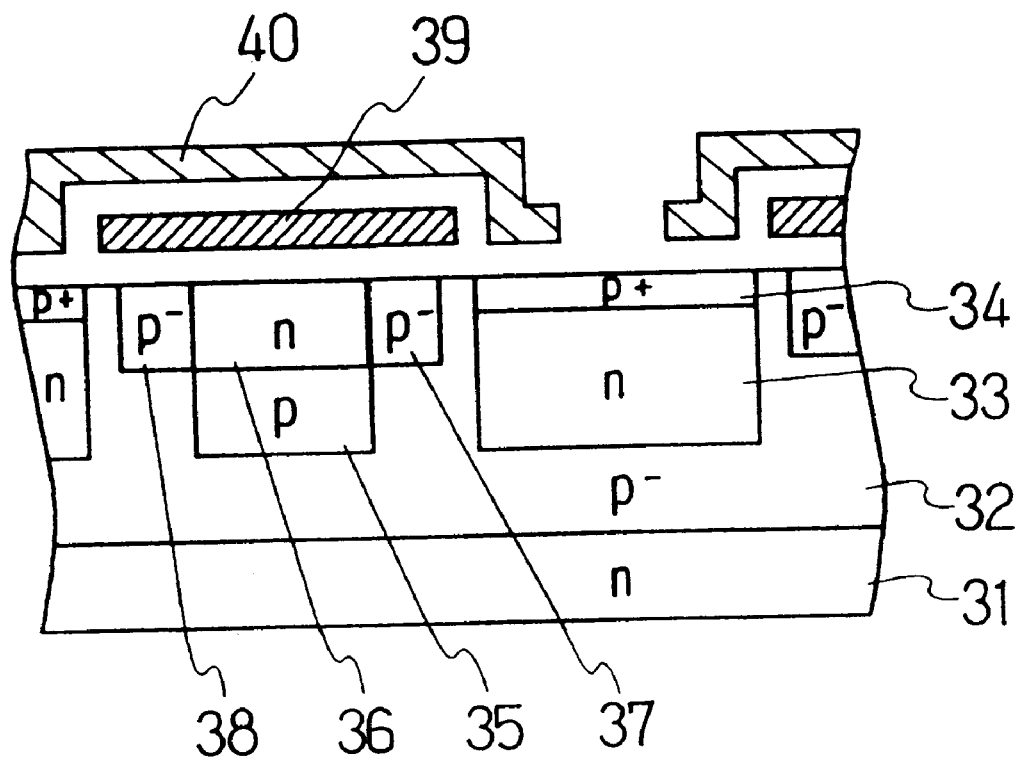
FIG. 9 is a cross section of a pixel portion of the solid-state image device in the second embodiment.

The advantage of this embodiment is that a process for manufacturing solid-state image devices can be simplified as explained below. FIG. 9 shows a cross section of a pixel portion of a solid-state image device according to this embodiment. On n-type substrate 31, p⁻-type region 32, n-type region 33, p⁺-type region 34, p-type region 35, n-type region 36, p⁻-type region 37 and p⁻-type region 38 are formed. Vertical CCD electrode (gate electrode) 39 and photo-shield film 40 are facing n-type region 36.

More specifically, n diffusion layers 33 and p⁺ diffusion layers 34 to be photodiode portions are formed in p⁻ diffusion layers formed on n-type substrate 31. Moreover, p diffusion layers 35 and n diffusion layers 36 to be channel portions of vertical CCDs are formed, and p⁻ diffusion layers 37 and 38 are formed adjacent to the n diffusion layer 36.

Figure 10A:
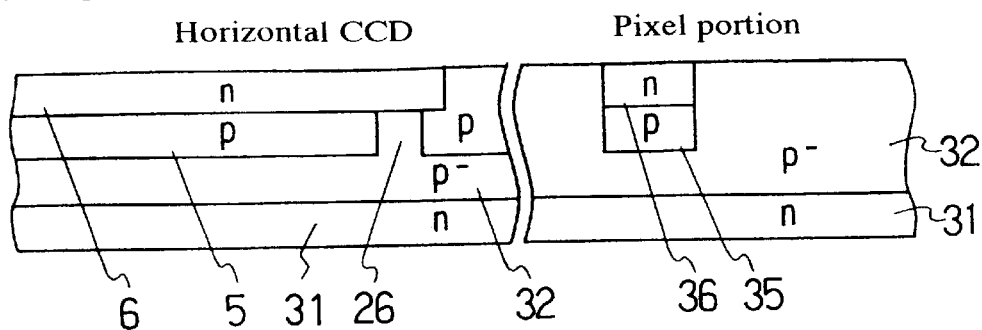
FIGS. 10A–10C are cross sections showing a process for manufacturing the solid-state image device in the second embodiment.
Figure 10B:
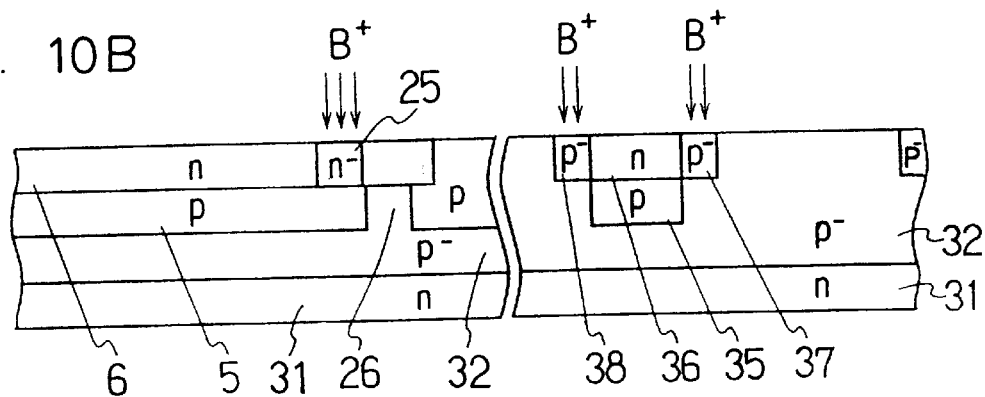
Figure 10C:
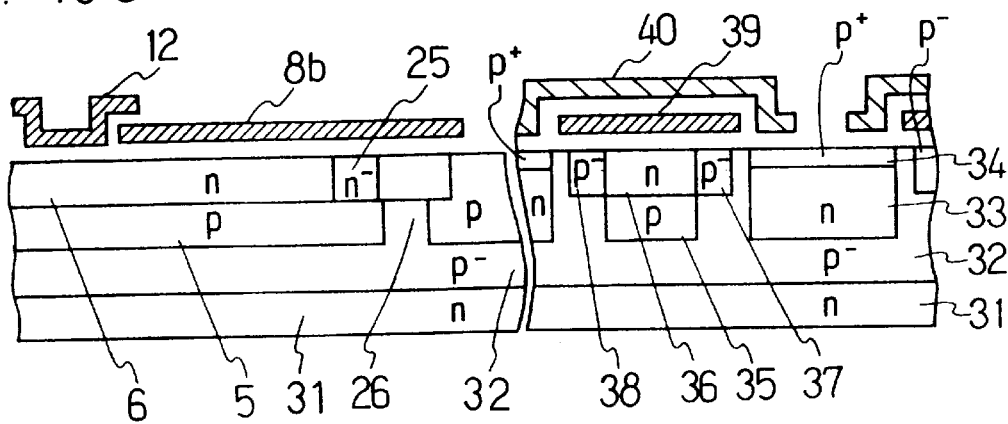

FIGS. 10A to 10C show a process for manufacturing solid-state image devices according to this embodiment. In each figure, the left half shows a cross section of the horizontal CCD portion, and the right half shows a cross section of the pixel portion.

First, as shown in FIG. 10A, p-type regions 5 of the horizontal CCD portion and p-type regions 35 of the pixel portions are formed by implanting boron ions into the p⁻-type region 32 formed on the n-type substrate 31. Then, n-type regions 6 of the horizontal CCD portion and n-type regions 36 of the pixel portions are formed by implanting phosphorus or arsenic ions. Formation of the p-type region 5, 35 and formation of n-type region 6, 36 are not limited to the above-mentioned order. The drain region 26 is not implanted with boron ions so as to maintain the p⁻-type region.

As shown in FIG. 10B, the n⁻-type region 25 to be the potential barrier region 25 is formed in the n-type region 6 of the horizontal CCD, and p⁻-type regions 37, 38 are formed at both sides of the n-type region 36 in the p⁻-type region 32 by implanting boron ions.

Next, as shown in FIG. 10C, first layer electrodes 8b and a vertical CCD electrode 12 are formed in the horizontal CCD. In the pixel portions, n-type regions 33 and p⁺-type regions 34 are formed in the p⁻-type regions 32, and vertical CCD electrodes 39 and photo-shield films 40 are formed on the substrate.

As explained above, the horizontal CCD portion and pixel portions of a solid-state image device according to the present embodiment can be manufactured through the process steps shown in FIGS. 10A to 10C. In other words, solid-state image devices according to the present invention can be manufactured efficiently without increasing the number of process steps since the potential barrier region and the charge drain region of the horizontal CCD portion can be formed in the step for forming pixel portions, i.e., photoelectric converters.

Figure 11:
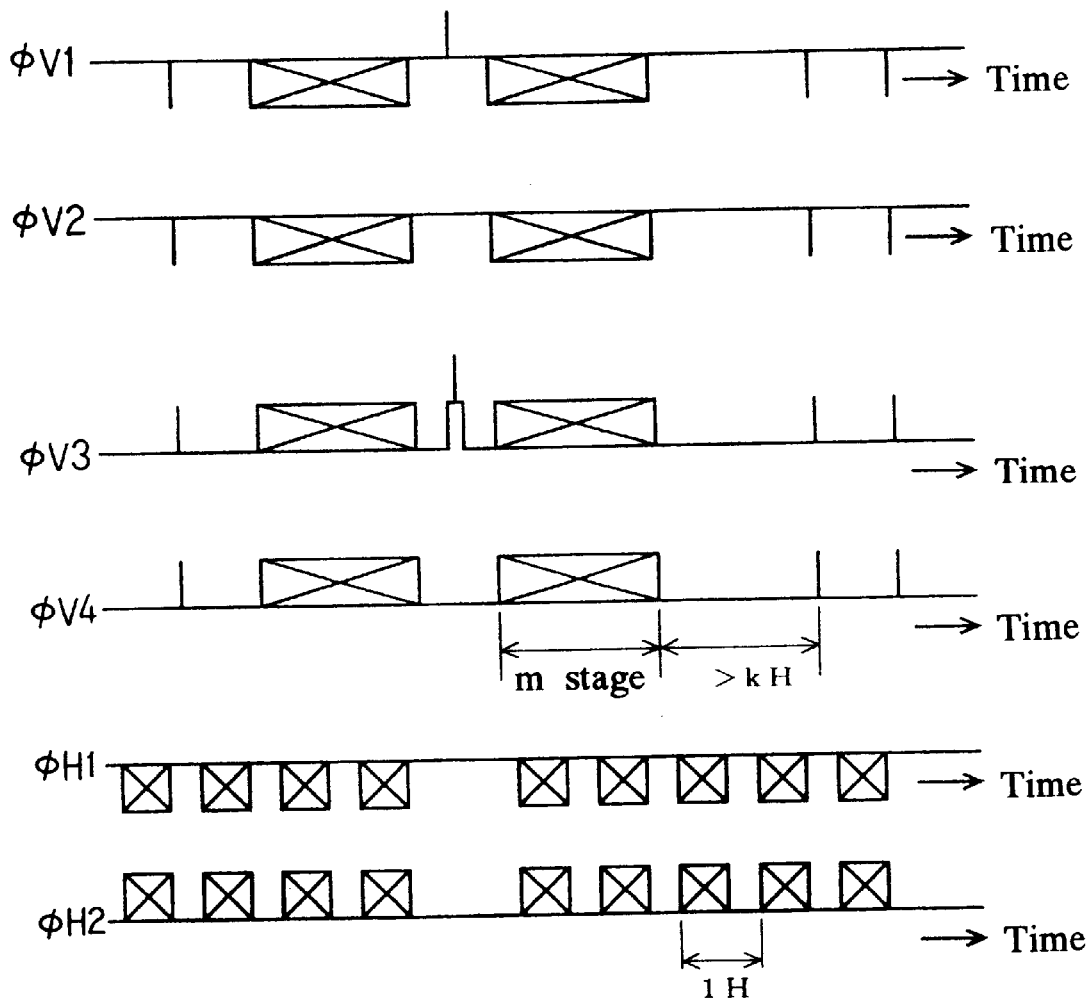
FIG. 11 shows driving waveforms of the solid-state image device according to the present invention.
Figure 12:
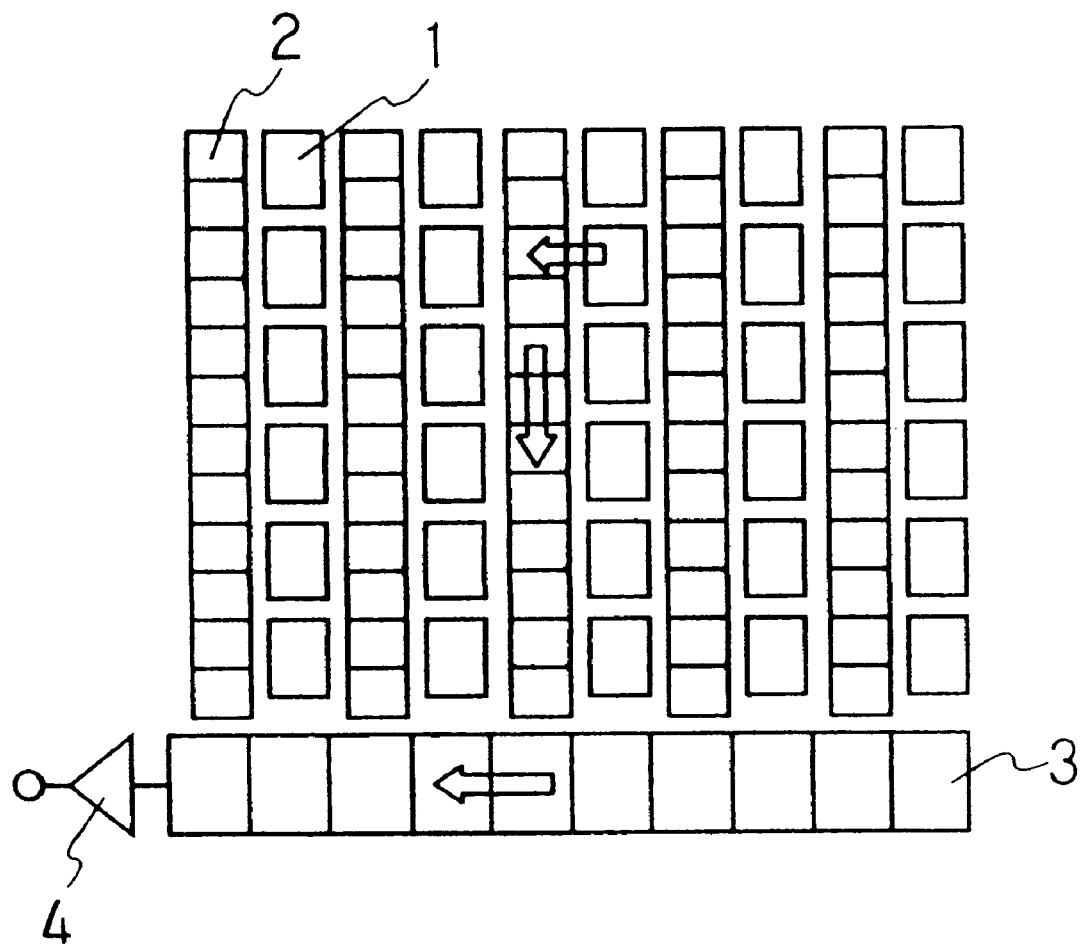
FIG. 12 shows a structure of a solid-state image device in the prior art.
Figure 13:
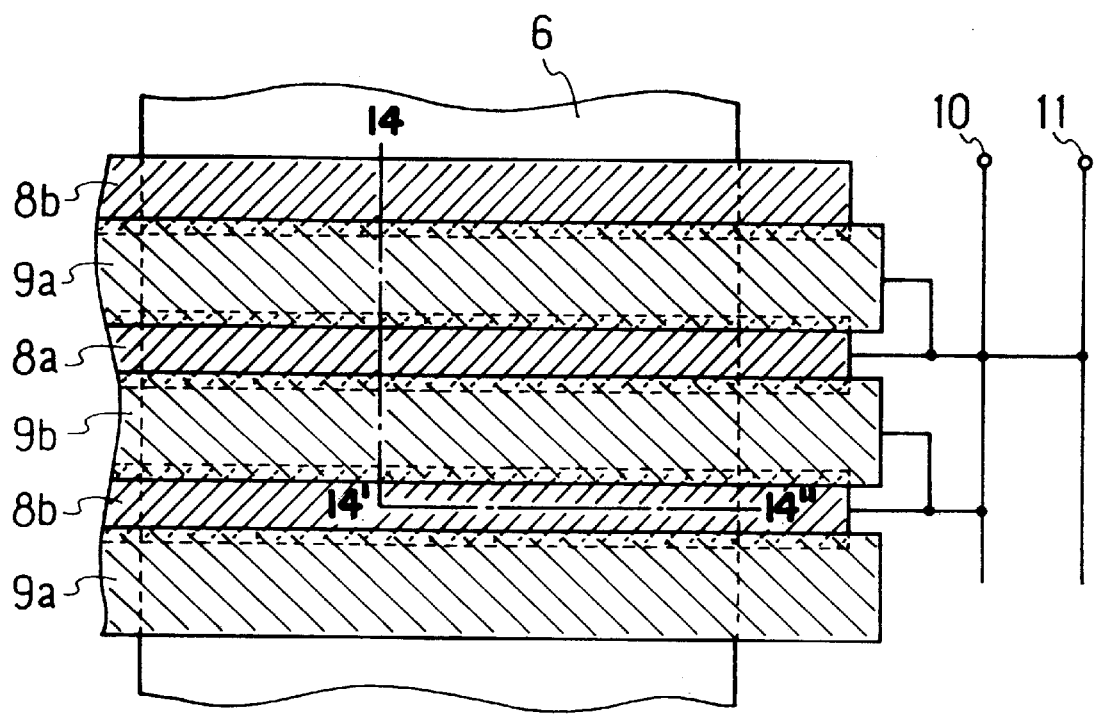
FIG. 13 is a plan view of a two-phase driving type horizontal CCD used in a solid-state image device of the prior art.
Figure 14:
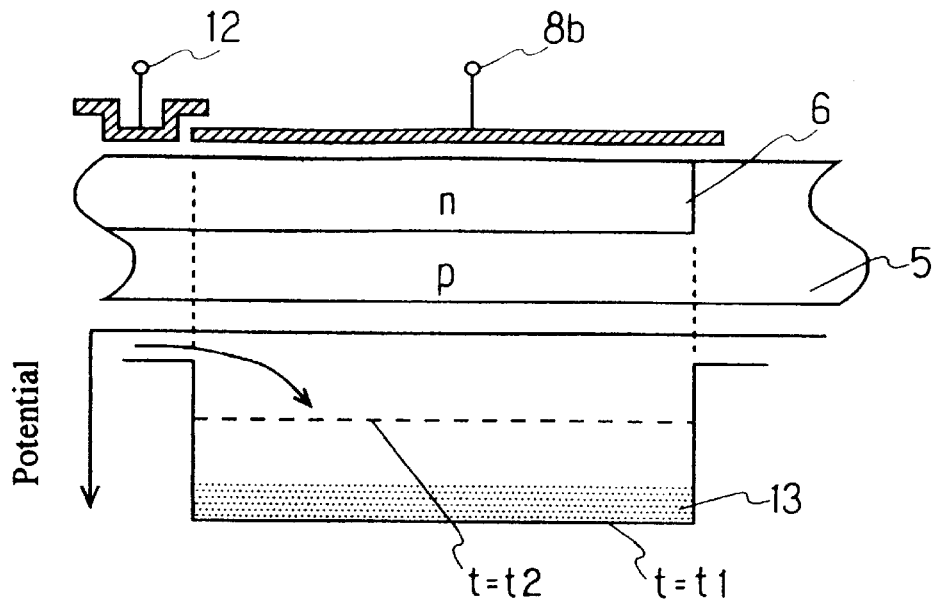
FIG. 14 shows a cross section and a potential distribution along line a'-a" in FIG. 13.
Figure 15:
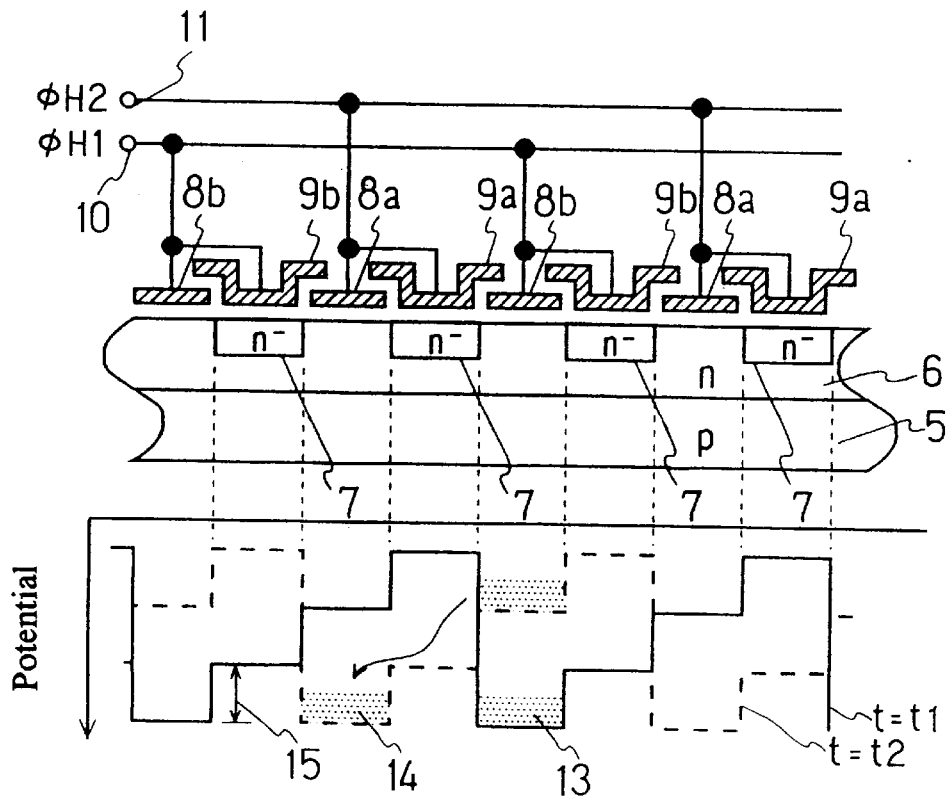
FIG. 15 shows a cross section and a potential distribution along line a-a' in FIG. 13.
Figure 16:
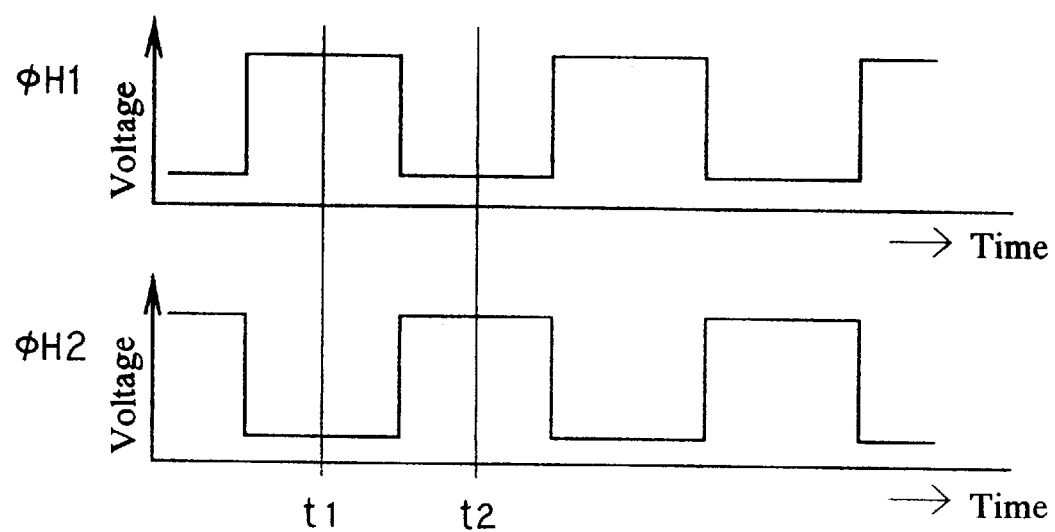
FIG. 16 shows voltage waveforms of the two-phase driving pulse for the horizontal CCD used in a solid-state image device of the prior art.

Next, the method for driving such solid-state image devices according to the present invention will be explained. FIG. 11 shows driving waveforms of the solid-state image device including four-phase driving type charge transfer devices as the vertical CCDs and two-phase driving type charge transfer device as the horizontal CCD. In FIG. 11, three-level pulses are used as driving pulses φ V1 and φ V3 for the vertical CCD. A signal charge is read from a photoelectric converter to a vertical CCD when the driving pulse is H (high) level voltage. The signal charge is transferred from φ V1 to φ V4 by using M (middle) level and L (low) level voltages. Read signal charges corresponding to m stages are transferred into the horizontal CCD by the high-speed mode.

Two-level pulses are used as the driving pulses φ H1 and φ H2 for the horizontal CCD. In the high-speed mode of the vertical CCD, if the charge quantity defined by the potential φ 1 of the potential barrier region is k times the transfer capacity of the horizontal CCD, all of the unnecessary charges can be discharged by setting the time period from the end of the high-speed mode to the beginning of the normal mode of the vertical CCD longer than k times the full transfer period of the horizontal CCD for transferring all of one line signal charges transferred from the vertical CCDs.

In the embodiment explained above, the channel is made of an n-type region, and electrons are used as signal charges. However, the present invention is not limited to such an embodiment, but can be embodied in the way that the channel is made of the p-type region and holes are used as the signal charges.

As explained above, the present invention provides a solid-state image device and its driving method, in which unnecessary signal charges corresponding to pixels located on the periphery of a screen can be discharged surely by the high-speed transfer mode. Thus, the image obtained after such an operation has a good quality. Moreover, according to the process of the present invention, such a solid-state image device can be manufactured efficiently without increasing the number of process steps.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes that come within the meaning and range of equivalency of the claims are intended to be embraced therein.

What is claimed is:

1. A solid-state image device comprising:

a plurality of photoelectric converters arranged on a semiconductor substrate;

a plurality of first charge transfer devices that receive signal charges from the photoelectric converters and transfer the signal charges;

a second charge transfer device connected to an end of each of the first charge transfer device for receiving the signal charges transferred by the first signal transfer devices and for transferring the signal charges in the direction crossing the first charge transfer devices;

a signal output circuit that receives the signal charge transferred by the second charge transfer devices and outputs the signal voltage corresponding to the signal charge;

a potential barrier region and a charge drain region formed along the side of the second charge transfer device opposite to the connection side with the first charge transfer devices;

the first charge transfer device having a normal mode for transferring the signal charges synchronizing with the second charge transfer device and a high-speed mode for transferring the signal charges fast without synchronizing with the second charge transfer device; and wherein the charge drain region has a resistance R and a capacitance C such that their product value RC is smaller than substantially ten times of the transfer period of the first charge transfer device in the high-speed mode.

2. The charge transfer device according to claim 1, wherein the potential barrier region and the charge drain region are formed in the step in which the photoelectric converters or the first charge transfer devices are formed.

3. A solid-state image device comprising:

a plurality of photoelectric converters arranged on a semiconductor substrate;

a plurality of first charge transfer devices that receive signal charges from the photoelectric converters and transfer the signal charges;

a second charge transfer device connected to an end of each of the first charge transfer device for receiving the signal charges transferred by the first signal transfer devices and for transferring the signal charges in the direction crossing the first charge transfer devices;

a signal output circuit that receives the signal charge transferred by the second charge transfer devices and outputs the signal voltage corresponding to the signal charge;

a potential barrier region and a charge drain region formed along the side of the second charge transfer device opposite to the connection side with the first charge transfer devices; and the first charge transfer device having a normal mode for transferring the signal charges synchronizing with the second charge transfer device and a high-speed mode for transferring the signal charges fast without synchronizing with the second charge transfer device, wherein a charge accumulation capacity defined by a potential of the potential barrier region and a potential of the second charge transfer device is smaller than substantially k times the transfer capacity of the second charge transfer device when a period from the end of the high-speed transfer mode to the beginning of the normal mode is k times of the horizontal scanning period that is the full transfer period of the second charge transfer device.

4. The charge transfer device according to claim 3, wherein the potential barrier region and the charge drain region are formed in the step in which the photoelectric converters or the first charge transfer devices are formed.

5. The charge transfer device according to claim 3, wherein the potential of the potential barrier region is substantially the same as the lower potential that defines the transfer capacity of the second charge transfer device.

6. The charge transfer device according to claim 3, wherein the potential of the potential barrier region is lower than the lower potential that defines the transfer capacity of the second charge transfer device.

7. The charge transfer device according to claim 3, wherein the second charge transfer device has first and second layer electrodes, a potential of the semiconductor substrate portion facing the first layer electrode is higher than that facing the second layer electrode, the second layer electrode is connected with the first layer electrode adjacent in the transfer direction, and the potential of the potential barrier region is substantially the same as the potential of the substrate portion facing the second layer electrode.

8. The charge transfer device according to claim 3, wherein the second charge transfer device has first and second layer electrodes, a potential of the semiconductor substrate portion facing the first layer electrode is higher than that facing the second layer electrode by $\phi$, the second layer electrode is connected with the first layer electrode adjacent in the transfer direction, and the relationship between the potential $\phi 1$ of the potential barrier region and the potential $\phi 2$ of the substrate portion facing the second layer electrode is expressed by the following equation when an area of the first layer electrode facing the semiconductor substrate is x times of an area of the second layer electrode facing the semiconductor substrate $$\phi 2 - \phi 1 < (k-1)\phi/(x+1).$$

9. A method for driving a solid-state image device that includes a plurality of photoelectric converters arranged on a semiconductor substrate, a plurality of first charge transfer devices, a second charge transfer device, a signal output circuit, a potential barrier region and a charge drain region formed along the side of the second charge transfer device, the method comprising steps of:

switching a transfer mode of the first charge transfer devices between a normal mode for transferring the signal charges synchronizing with the second charge transfer device and a high-speed mode for transferring the signal charges quickly without synchronizing with the second charge transfer device; and setting a period from the end of the high-speed transfer mode to the beginning of the normal mode more than k times of the horizontal scanning period that is the full transfer period of the second charge transfer device when a charge accumulation capacity defined by a potential of the potential barrier region and a potential of the second charge transfer device is k times of the transfer capacity of the second charge transfer device.

* * * * *